US012578304B2

(12) United States Patent
Ogawa et al.

(10) Patent No.: US 12,578,304 B2
(45) Date of Patent: Mar. 17, 2026

(54) METHOD FOR RECOVERING BIOLOGICAL SUBSTANCE AND DEVICE FOR RECOVERING BIOLOGICAL SUBSTANCE

(71) Applicant: HITACHI HIGH-TECH CORPORATION, Tokyo (JP)

(72) Inventors: Mima Ogawa, Tokyo (JP); Takahide Yokoi, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 486 days.

(21) Appl. No.: 17/617,424

(22) PCT Filed: Apr. 7, 2020

(86) PCT No.: PCT/JP2020/015615
§ 371 (c)(1),
(2) Date: Dec. 8, 2021

(87) PCT Pub. No.: WO2020/255539
PCT Pub. Date: Dec. 24, 2020

(65) Prior Publication Data
US 2022/0260523 A1     Aug. 18, 2022

(30) Foreign Application Priority Data
Jun. 20, 2019    (JP) ................................. 2019-114723

(51) Int. Cl.
G01N 27/447 (2006.01)
(52) U.S. Cl.
CPC . G01N 27/44743 (2013.01); G01N 27/44782 (2013.01)

(58) Field of Classification Search
CPC ....... G01N 27/44743; G01N 27/44739; G01N 27/44782; B01D 15/3885
See application file for complete search history.

(56) References Cited

U.S. PATENT DOCUMENTS 5,993,628 A * 11/1999 Selby ............... G01N 27/44743
204/620
9,719,961 B2 8/2017 Sabin et al.
(Continued)

FOREIGN PATENT DOCUMENTS

EP          3425382 A1    1/2019
JP     H08-327595 A    12/1996
(Continued)

OTHER PUBLICATIONS

Communication pursuant to Article 94(3) EPC issued on Aug. 21, 2025 for European Patent Application No. 1 20825449.0.

*Primary Examiner* — C. Sun
(74) *Attorney, Agent, or Firm* — Volpe Koenig

(57) ABSTRACT
A method for recovering a biological substance and a device for recovering a biological substance capable of improving a recovery rate of a target biological substance with a simple configuration are provided. The method for recovering a biological substance uses an electrophoresis device having a gel 13 and recovery holes 11 and 111. The method for recovering a biological substance includes a step of starting application of a voltage for moving a target biological substance toward the recovery hole, after that, a step of removing buffer solution in the recovery hole before the target biological substance reaches the recovery hole, after that, a step of injecting a solvent into the recovery hole, and, after that, a step of recovering the target biological substance that reaches the recovery hole.

5 Claims, 4 Drawing Sheets

(56)       References Cited

U.S. PATENT DOCUMENTS

| | | |
|---|---|---|
| 2008/0057557 A1 | 3/2008 | Margalit |
| 2010/0270159 A1* | 10/2010 | Doucette ................ B01D 57/02 |
| | | 204/600 |
| 2011/0094887 A1 | 4/2011 | Midorikawa et al. |
| 2015/0323498 A1* | 11/2015 | Wu ...................... C12Q 1/6806 |
| | | 204/627 |
| 2016/0370318 A1 | 12/2016 | Sabin et al. |
| 2019/0025251 A1* | 1/2019 | Yabe ................ G01N 27/44743 |
| 2023/0343949 A1* | 10/2023 | Young .................... H01M 4/48 |

FOREIGN PATENT DOCUMENTS

| | | |
|---|---|---|
| JP | 2004-290109 A | 10/2004 |
| JP | 2005-241477 A | 9/2005 |
| JP | 2010-8376 A | 1/2010 |
| JP | 2010-502962 A | 1/2010 |
| JP | 2011-502243 A | 1/2011 |

* cited by examiner

METHOD FOR RECOVERING BIOLOGICAL SUBSTANCE AND DEVICE FOR RECOVERING BIOLOGICAL SUBSTANCE

TECHNICAL FIELD

The present invention relates to a method for recovering a biological substance and a device for recovering a biological substance.

BACKGROUND ART

Using a method for recovering a biological substance and a device for recovering a biological substance, it is possible to easily recover only a target substance from some biological substances by electrophoresis as high purity and high concentration recovery liquid.

A gel electrophoresis method is a method for analyzing a biological substance such as a nucleic acid or a protein by utilizing a phenomenon that a substance moves in an electrode direction of opposite polarity when an electric field is applied to a charged substance. In general, an electrophoresis gel such as an agarose gel or an acrylamide gel is used as a support of a biological substance. Since a moving speed in the electrophoresis gel varies depending on the molecular weight of a biological substance, a biological substance is separated as a band that differs for each molecular weight. Since the gel electrophoresis method has high resolution for separation of a biological substance, the gel electrophoresis method is also employed for separating and recovering a biological substance having a target molecular weight from a biological substance having another molecular weight.

As a method for recovering a biological substance having a target molecular weight, a method of excising a target band separated by electrophoresis together with a surrounding electrophoresis gel, and recovering the biological substance from the excised electrophoresis gel is generally employed. However, when the biological substance is recovered from the excised electrophoresis gel, there has been a problem that the concentration of the biological substance changes or a step for the excision is additionally required.

As a method in which excision of an electrophoresis gel is not required and a target biological substance is recovered simultaneously with electrophoresis, for example, PTLs 1 and 2 disclose that a recovery hole for a biological substance is provided in the electrophoresis gel in advance. The method of forming a recovery hole in a biological substance has an advantage that there is no possibility of contamination because an unnecessary substance that migrates earlier than a target biological substance passes through the recovery hole and continue migration. However, for the same reason, the target biological substance also easily passes through the recovery hole, and there has been a problem that a high recovery rate of the target biological substance cannot be expected.

Note that, similarly, as a method for recovering a target biological substance simultaneously with electrophoresis, for example, PTL 3 discloses a method in which a flow channel of electrophoresis is bifurcated, and only a target biological substance is moved to a recovery chamber by switching of an electrodes.

CITATION LIST

Patent Literature

PTL 1: JP 2004-290109 A
PTL 2: JP 2010-502962 A
PTL 3: U.S. Pat. No. 9,719,961

SUMMARY OF INVENTION

Technical Problem

However, in the conventional configuration, there has been a problem that it is difficult to improve a recovery rate of a target biological substance.

For example, in the configurations of PTLs 1 and 2, since a hole is formed in the middle of the gel, a biological substance that has reached the recovery hole continues electrophoresis even after the recovery hole, and thus it is difficult to efficiently recover the target biological substance.

Note that, in the configuration of PTL 3, two recovery chambers that are electrically and physically separated are required, and there is a problem that the required area and volume increase accordingly.

In view of the above, an object of the present invention is to provide a method for recovering a biological substance and a device for recovering a biological substance capable of improving a recovery rate of a target biological substance with a simple configuration.

Solution to Problem

In order to solve the above problem, an example of a method for recovering a biological substance of the present invention is a method for recovering a biological substance using an electrophoresis device having a separation medium and a recovery hole, the method for recovering a biological substance including:

a voltage application start step of starting application of a voltage for moving a target biological substance toward the recovery hole;

a buffer solution removing step of removing buffer solution in the recovery hole before the target biological substance reaches the recovery hole after the voltage application start step;

a solvent injection step of injecting a solvent into the recovery hole after the buffer solution removing step; and a recovery step of recovering the target biological substance that reached the recovery hole after the solvent injection step.

Further, an example of a device for recovering a biological substance of the present invention is a device for recovering a biological substance for separating and recovering a target biological substance using an electric field, in which the device for recovering a biological substance includes a separation medium, and in the separation medium, a cross-sectional area of an outflow portion from which the target biological substance flows out taken along a plane orthogonal to a direction of the electric field is smaller than a cross-sectional area of an inflow portion into which the target biological substance flows taken along a plane orthogonal to the direction of the electric field.

The present specification includes the disclosed content of Japanese Patent Application No. 2019-114723 on which priority of the present application is based.

Advantageous Effects of Invention

According to the method for recovering a biological substance and the device for recovering a biological substance according to the present invention, a recovery rate of the target biological substance can be improved with a simple configuration.

DESCRIPTION OF EMBODIMENTS

Figure 1:
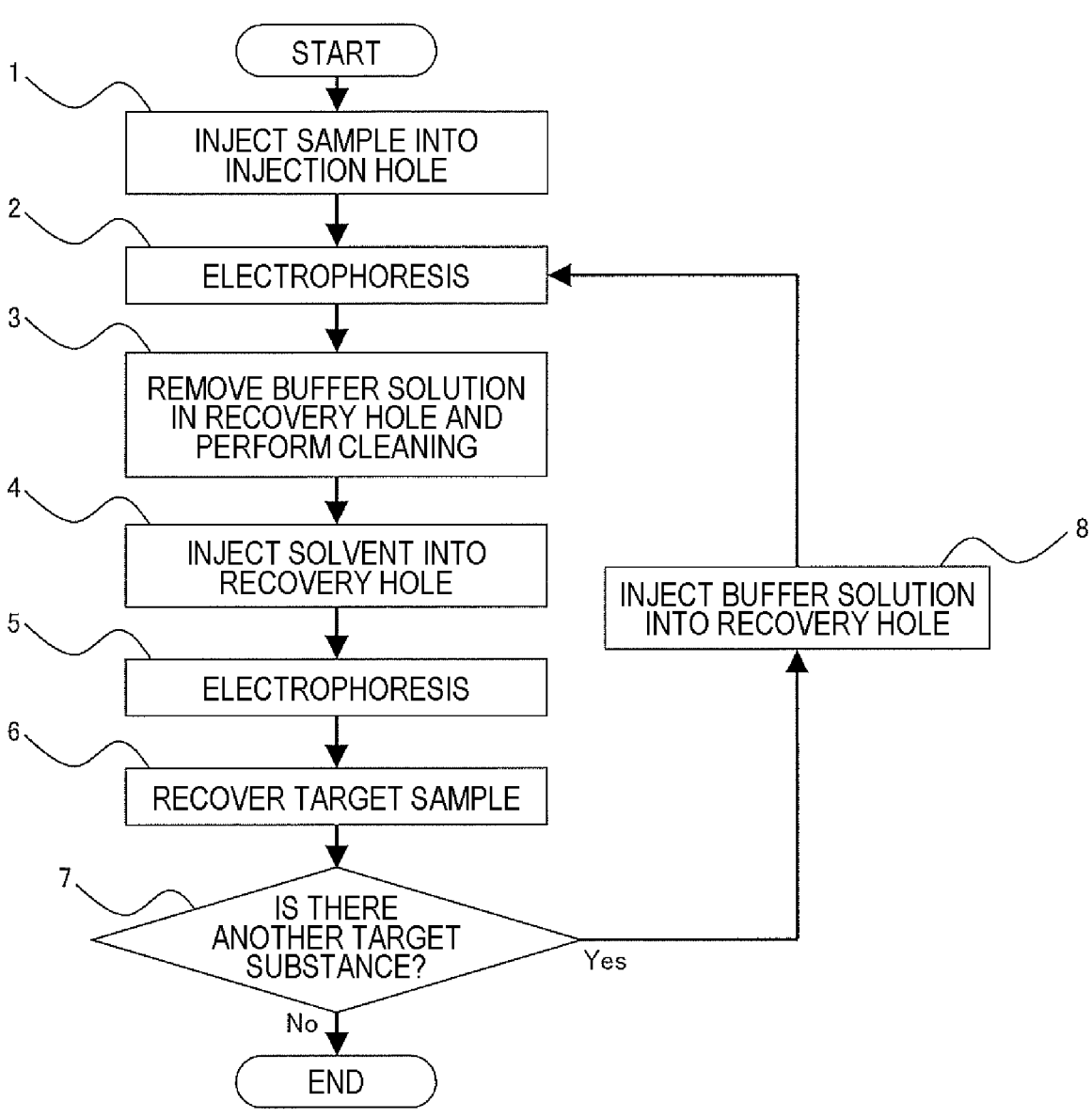
FIG. 1 is a workflow diagram illustrating a separation and recovery workflow according to a first embodiment of the present invention.

In all the drawings for explaining the present embodiments, components having the same function are denoted by the same reference numeral, and repeated description of the components may be omitted. Further, the present invention should not be construed as being limited to the description of the embodiments below. Although the present invention is defined by the appended claims, as easily understood by those skilled in the art, the specific configuration of the present invention can be changed without departing from the spirit or gist of the present invention.

There is a case where a position, size, shape, range, and the like of each constituent shown in the drawings and the like do not represent an actual position, size, shape, range, and the like, in order to facilitate understanding of the invention. For this reason, the present invention is not necessarily limited to a position, size, shape, range, and the like disclosed in the drawings and the like.

In the present description, a constituent shown in a singular form includes a plural form unless otherwise specifically clarified.

First Embodiment

A method for recovering a biological substance and a device for recovering a biological substance according to a first embodiment will be described with reference to FIGS. 1, 2, 3, 4, and 5.

Figure 2:
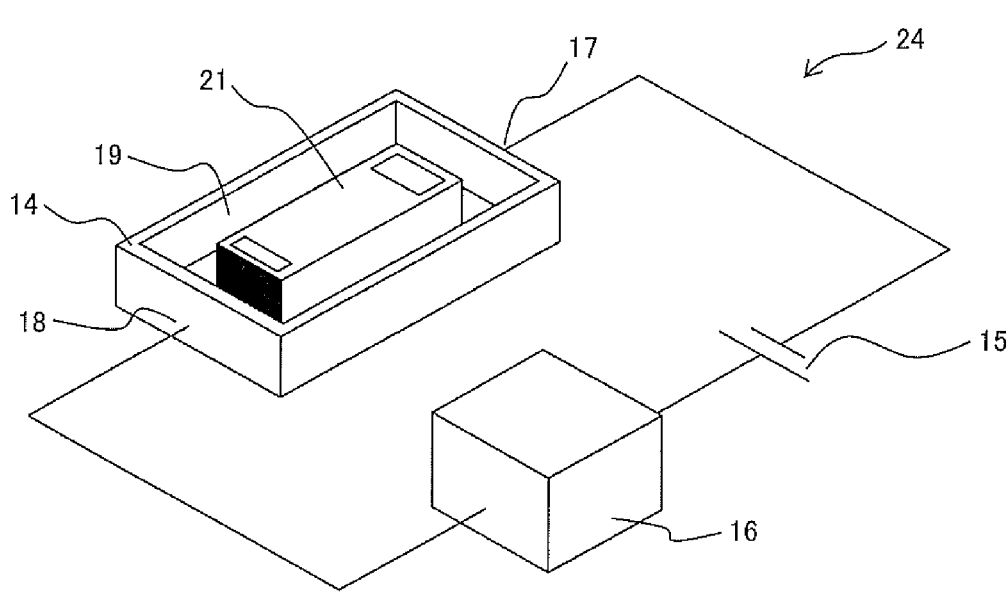
FIG. 2 is a schematic perspective view illustrating the separation and recovery system according to the first embodiment of the present invention.

FIG. 1 is a workflow diagram illustrating a separation and recovery workflow according to the first embodiment, and can also be interpreted as a flowchart illustrating a procedure of the method for recovering a biological substance. FIG. 2 is a schematic perspective view illustrating a separation and recovery system used for recovering a biological substance.

As illustrated in FIG. 2, the separation and recovery system according to the first embodiment is realized as an electrophoresis system. The electrophoresis system includes an electrophoresis unit 21 and an electrophoresis device 24. The electrophoresis device 24 includes a voltage control unit 16, a power supply 15, an electrophoresis tank 14, a positive electrode 18, and a negative electrode 17.

The electrophoresis unit 21 is an example of a device for recovering a biological substance for separating and recovering a target biological substance using an electric field, and is used to execute the method for recovering a biological substance according to the present embodiment.

The voltage control unit 16 controls a voltage applied between the positive electrode 18 and the negative electrode 17. By applying a voltage between the positive electrode 18 and the negative electrode 17, an electric field directed from the positive electrode 18 to the negative electrode 17 is generated in the electrophoresis tank 14.

The electrophoresis tank 14 houses the electrophoresis unit 21, buffer solution 19, the positive electrode 18, and the negative electrode 17. The positive electrode 18 and the negative electrode 17 are immersed in the buffer solution 19 in the electrophoresis tank 14. Although specific structures of the positive electrode 18 and the negative electrode 17 are not particularly illustrated in FIG. 2, those skilled in the art can appropriately arrange the positive electrode 18 and the negative electrode 17 so as to generate an electric field in the electrophoresis tank 14 while insulating the positive electrode 18 and the negative electrode 17 from each other.

Note that, hereinafter, a case where a target biological substance to be recovered is a nucleic acid will be described as an example. Since the nucleic acid is negatively charged, the direction of electrophoresis is opposite to the direction of an electric field, and electrophoresis is performed from the negative electrode 17 side toward the positive electrode 18 side. Note that, in a case where a positively charged biological substance is recovered, the direction of the electrophoresis unit 21 is reversed, or the arrangement of the positive electrode 18 and the negative electrode 17 is reversed.

Figure 3:
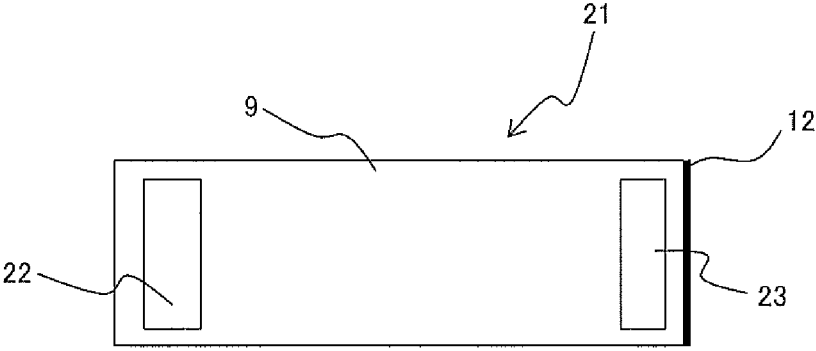
FIG. 3 is a top view of an electrophoresis unit of FIG. 2.
Figure 4:
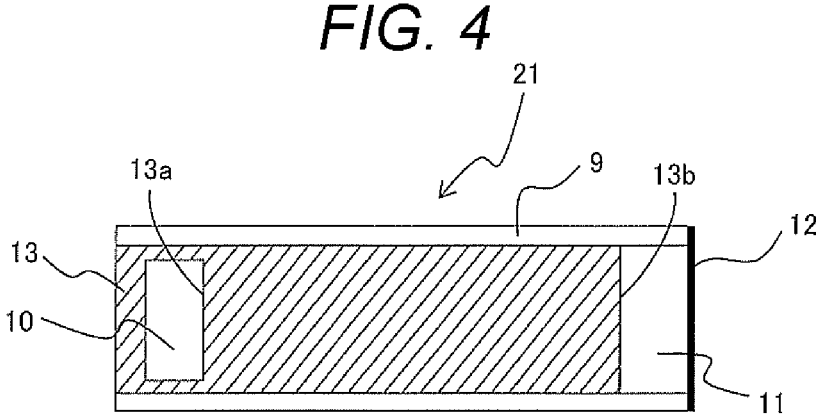
FIG. 4 is a horizontal cross-sectional view of the electrophoresis unit of FIG. 2.
Figure 5:
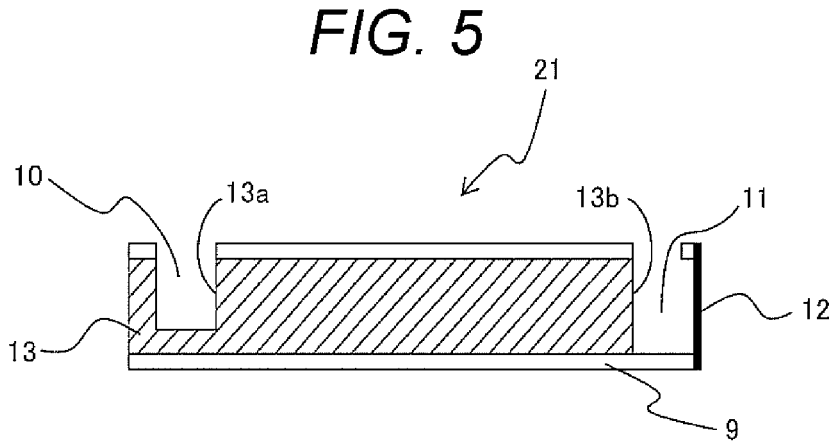
FIG. 5 is a vertical cross-sectional view of the electrophoresis unit of FIG. 2.

FIG. 3 is a top view of the electrophoresis unit 21, FIG. 4 is a horizontal cross-sectional view of the electrophoresis unit 21, and FIG. 5 is a vertical cross-sectional view taken along a plane parallel to the direction of the electric field of the electrophoresis unit 21.

The electrophoresis unit 21 is immersed in the buffer solution 19 in the electrophoresis tank 14. As illustrated in FIGS. 3, 4, and 5, the electrophoresis unit 21 includes an insulation 9 covering a gel, a gel 13 (electrophoresis gel), an injection hole 10, and a recovery hole 11.

The gel 13 is an example of a separation medium used for separating a target biological substance and an unnecessary substance. As the gel 13, for example, a publicly-known gel such as agarose gel or polyacrylamide gel can be used. The thickness of the gel 13 is not particularly limited, but is preferably 2 to 18 mm from the viewpoint that a band of a biological substance obtained by electrophoresis is sharp and easy to visually recognize. Note that the thickness of the gel 13 does not need to be constant. In FIGS. 4 and 5, the gel 13 is a substantially rectangular parallelepiped, but its shape is not limited.

In connection with the gel 13, the injection hole 10 and the recovery hole 11 are provided. The injection hole 10 is a structure for injecting a mixture of biological substances having various molecular weights. In the present embodiment, the injection hole 10 is formed as a recess opened toward an upper surface at one end of the gel 13 or in its vicinity.

A biological substance is injected into the injection hole as injection solution mixed with liquid having a specific gravity larger than that of the buffer solution 19. Examples of a solvent in which a biological substance is mixed include glycerol aqueous solution and sugar water. In a case where the solvent is glycerol aqueous solution, the glycerol concentration can be, for example, 6%. The viscosity of the injection solution can be, for example, 1 mPa·s.

The recovery hole 11 is a configuration for recovering a biological substance having a target molecular weight (target biological substance). In the present embodiment, the recovery hole 11 is formed as a recess opened toward an upper surface at one end of the gel 13 (however, an end opposite to the injection hole 10) or in its vicinity.

The injection solution flows into the gel 13 from the injection hole 10, migrates through the gel 13, and flows out of the gel 13 in the recovery hole 11. The gel 13 has an inflow portion into which the target biological substance flows and an outflow portion from which the target biological substance flows out. The inflow portion and the outflow portion are constituted by, for example, end surfaces of the gel 13 facing the injection hole 10 and the recovery hole 11. In the present embodiment, as illustrated in FIGS. 4 and 5, the inflow portion is a first end surface 13a of the gel 13 constituting a negative electrode side peripheral wall of the injection hole 10 (or a peripheral wall on the recovery hole 11 side), and the outflow portion is a second end surface 13b of the gel 13 constituting a positive electrode side peripheral wall of the recovery hole 11 (or a peripheral wall on the injection hole 10 side).

Note that, in the present embodiment, both the inflow portion and the outflow portion are flat surfaces, and are provided perpendicularly to the direction of the electric field in particular. However, such a configuration is not essential. Further, the configuration may be such that a part of the target biological substance flows in or out through a portion other than the inflow portion and the outflow portion.

The interval between the injection hole 10 and the recovery hole 11 can be set as desired. However, the recovery hole 11 is preferably provided in the vicinity of a position where a biological substance having a target molecular weight appears as a band. This position can be appropriately designed according to a composition (for example, gel concentration) of a separation medium, the molecular weight of the target biological substance, the molecular weight of an unnecessary substance (for example, a substance to be discarded separately from the target biological substance), and the like.

In the present embodiment, the injection hole 10 and the recovery hole 11 are substantially rectangular parallelepipeds. However, the structure, shape, size, and the like of the injection hole 10 and the recovery hole 11 are not limited to those illustrated in the drawings. The structure, shape, size, and the like of the injection hole 10 and the recovery hole 11 can be set as desired. In FIG. 2, width direction dimensions of the injection hole 10 and the recovery hole 11 (that is, dimensions in the horizontal direction orthogonal to the direction of the electric field) are the same. However, the width direction dimensions may be different.

Further, in the present embodiment, as illustrated in FIG. 5, the entire circumference and the bottom portion of the injection hole 10 are all constituted by the gel 13. However, a part of the circumference and the bottom portion may be constituted by the insulation 9 or another constituent.

Furthermore, in the present embodiment, a part (one surface) of the circumference of the recovery hole 11 is constituted by the end surface of the gel 13 (that is, the second end surface 13b), and the other part is constituted by a structure other than the gel 13. Specifically, the remaining portion of the circumference is constituted by the insulation 9 (including a film 12 to be described later), and the bottom portion is also constituted by the insulation 9. However, the specific configuration of the recovery hole 11 is not limited to the above, and for example, the entire circumference and the bottom portion of the recovery hole 11 can be constituted by the gel 13.

Examples of a method for forming the injection hole 10 and the recovery hole 11 include, but are not particularly limited to, a method in which a comb is inserted before the gel 13 is solidified, a method in which the solidified gel 13 is excised to form the injection hole 10 and the recovery hole 11, and a method in which the solidified gel 13 is melted by applying heat to form the injection hole 10 and the recovery hole 11.

The insulation 9 has an upper opening portion 22 forming an opening of the injection hole 10 and an upper opening portion 23 forming an opening of the recovery hole 11. The insulation 9 can be configured as an insulating container that covers the gel 13 (for example, covers at least a region between the first end surface 13a and the second end surface 13b of the gel 13). Further, the insulation 9 has the film 12 that forms a part of the circumference of the recovery hole 11. The film 12 is provided on the side opposite to the second end surface 13b of the gel 13 with respect to the recovery hole 11.

The material of the film 12 can be as desired. However, a selective permeable film that does not allow the target biological substance to pass through while allowing ions (however, those other than the target biological substance) to pass through is suitable from the viewpoint of efficiently recovering only the target biological substance.

Next, a method for recovering a biological substance according to the first embodiment will be described with reference to FIG. 1. The electrophoresis method according to the present embodiment includes steps of Steps 1 to 8.

Step 1 is a step in which the user injects injection solution containing the target biological substance into the injection hole 10 of the gel 13.

Step 2 is a step in which the power supply 15 and the voltage control unit 16 apply an electric field penetrating the injection hole 10 and the recovery hole 11 to perform electrophoresis. More specifically, Step 2 includes a step (voltage application start step) of starting application of a voltage for moving the target biological substance toward the recovery hole 11, and a step (voltage application stop step) of stopping the application of the voltage after the voltage application start step.

Step 3 includes a step (buffer solution removing step) of removing the buffer solution in the recovery hole 11 before the target biological substance reaches the recovery hole 11. Further, in some cases, Step 3 includes a step (cleaning step) of cleaning the recovery hole 11 using cleaning liquid after the buffer solution removing step.

As described above, by removing the buffer solution in the recovery hole 11 and cleaning, the performance of removing an unnecessary substance (for example, a biological substance not intended) is enhanced. In this manner, concentration of the target biological substance in the solution to be recovered can be improved.

Step 4 is a step (solvent injection step) in which the user injects a solvent into the recovery hole 11.

The timing of executing Steps 3 and 4 can be appropriately designed by those skilled in the art as long as it is before the target biological substance reaches the recovery hole 11. For example, the target biological substance may be dyed in advance, and the timing may be determined by visual observation. Alternatively, time for the target biological substance to reach the recovery hole 11 may be measured or estimated in advance, and the timing may be determined on the basis of elapsed time. From the viewpoint of efficiently improving the concentration, it is preferable to perform Steps 3 and 4 immediately before the target biological substance reaches the recovery hole 11.

Step 5 is a step in which the power supply 15 and the voltage control unit 16 apply an electric field penetrating the injection hole 10 and the recovery hole 11 again to perform electrophoresis. More specifically, like Step 2, Step 5 includes a step (voltage application restart step) of starting application of a voltage for moving the target biological substance toward the recovery hole 11, and a step (voltage application stop step) of stopping the application of the voltage after the voltage application restart step.

Here, by Step 5, the target biological substance reaches the inside of the recovery hole 11. Note that since the film 12 does not allow the target biological substance to pass through, the target biological substance remains in the recovery hole 11 even if stoppage of the voltage application is delayed (or the voltage application is not stopped), and the recovery efficiency of the target biological substance is improved. Furthermore, since the film 12 permeates ions other than the target biological substance, the concentration of the target biological substance in the solution to be recovered can be improved.

Step 6 is a step (recovery step) in which the user recovers the target biological substance that reached the recovery hole 11 from the recovery hole 11. For example, the user recovers the target biological substance by acquiring sample solution in the recovery hole 11.

Step 7 is a step of determining whether there is another target biological substance. In a case where there is another target biological substance in Step 7, Step 8 is executed. Step is a step (buffer solution injection step) of injecting the buffer solution into the recovery hole 11. After Step 8, the processing returns to Step 2 described above, and each step is repeated. That is, additional Step 2 (voltage application start step and voltage application stop step), additional Step 3 (buffer solution removing step and cleaning step), additional Step 4 (solvent injection step), additional Step 5 (voltage application restart step and voltage application stop step), and additional Step 6 (recovery step) are executed, and further, in additional Step 7, it is determined whether there is another target biological substance. By such repetition, a plurality of types of target biological substances can be recovered in ascending order of molecular weight.

As described above, according to the electrophoresis unit 21 and the related method for recovering a biological substance according to the first embodiment, it is possible to fractionate and recover the target biological substance with high efficiency as compared with the conventional method.

Further, such an effect can be obtained with a simple configuration. For example, there is a conventional configuration in which a flow path of a separation medium is branched (PTL 3 and the like). However, as compared with such a configuration, in the electrophoresis unit 21 and the related method for recovering a biological substance, a flow path of a separation medium can be made continuous, so that the volume required for processing one sample can be reduced, and the configuration is simplified.

Second Embodiment

In a second embodiment, the configuration of the electrophoresis unit 21 of the first embodiment is changed. Hereinafter, the method for recovering a biological substance and the device for recovering a biological substance, that is, an electrophoresis unit 121 according to the second embodiment will be described with reference to FIGS. 6, 7, and 8.

Figure 6:
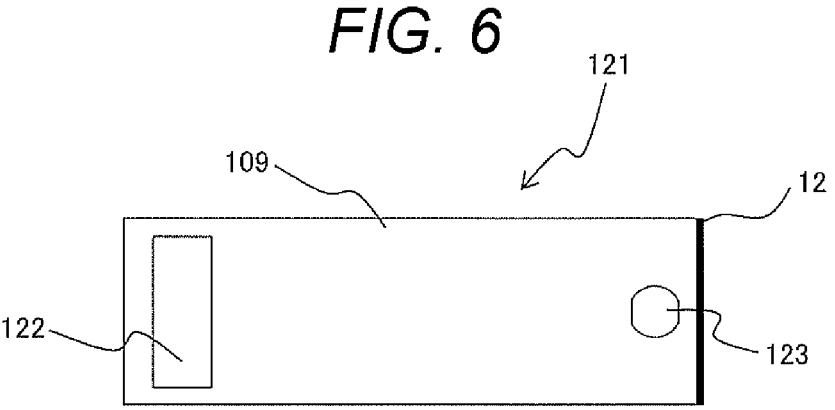
FIG. 6 is a top view of the electrophoresis unit according to a second embodiment of the present invention.
Figure 7:
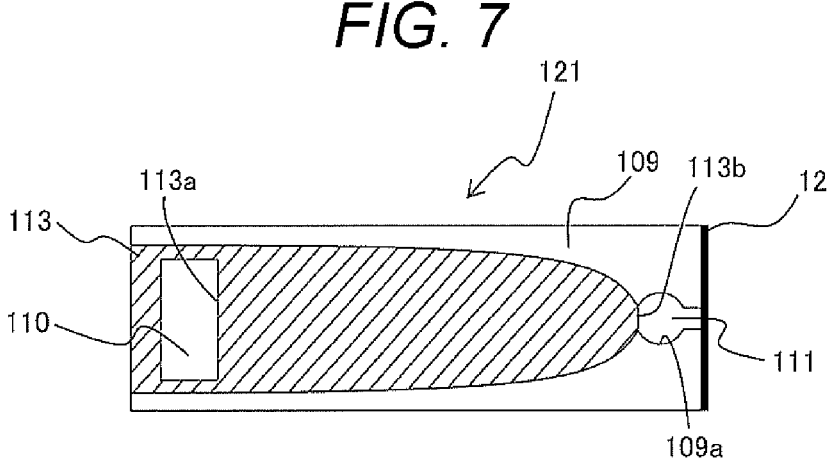
FIG. 7 is a horizontal cross-sectional view of the electrophoresis unit of FIG. 6.
Figure 8:
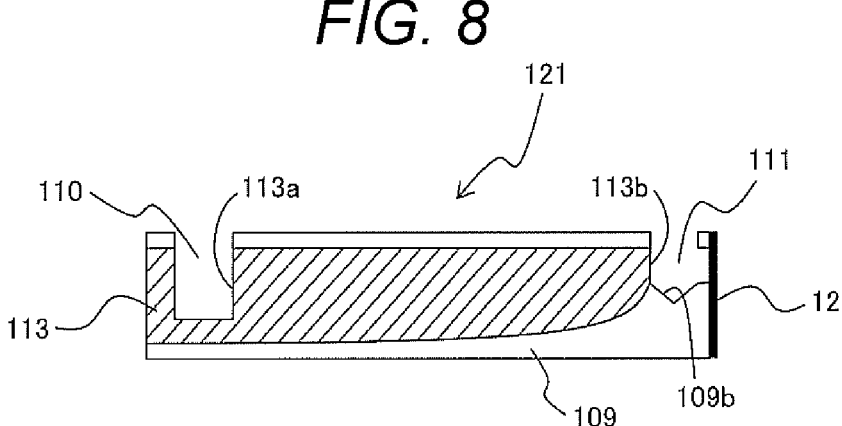
FIG. 8 is a vertical cross-sectional view of the electrophoresis unit of FIG. 6.

FIG. 6 is a top view of the electrophoresis unit 121, FIG. 7 is a horizontal cross-sectional view of the electrophoresis unit 121, and FIG. 8 is a vertical cross-sectional view taken along a plane parallel to the direction of the electric field of the electrophoresis unit 121. Hereinafter, a difference from the first embodiment will be described.

The electrophoresis unit 121 includes an insulation 109 covering a gel, a gel 113 (electrophoresis gel), an injection hole 110, and a recovery hole 111. The injection hole 110 can have the same configuration as the injection hole 10 of the first embodiment, for example. Further, an inflow portion of the gel 113 is a first end surface 113*a*, and can have the same configuration as the first end surface 13*a* of the first embodiment.

In contrast, a structure of the recovery hole 111 is different from that of the recovery hole 11 of the first embodiment, and, particularly, is smaller in volume. In particular, in the present embodiment, the volume of the recovery hole 111 is smaller than the volume of the injection hole 110. For example, in the present embodiment, a width (dimension in the horizontal direction orthogonal to the direction of the electric field) and a depth (dimension in the vertical direction) of the recovery hole 111 are smaller than those in the first embodiment. As described above, since the recovery hole 111 is configured to be small, an amount of solution to be recovered is reduced, and thus the concentration of the target biological substance in the solution to be recovered is improved.

Further, a part of a peripheral wall of the recovery hole 111 is constituted by the insulation 109, and a part of it is constituted by a cylindrical surface 109*a*. In the example of FIG. 7, the entire peripheral wall of the recovery hole 111 is constituted by the cylindrical surface 109*a* except for a portion constituted by the gel 113 (second end surface 113*b*) and a portion corresponding to a passage to the film 12 in the peripheral wall of the recovery hole 111. By using the cylindrical surface in this manner, the volume can be reduced without extremely reducing the dimension in a specific direction. For this reason, even if the volume is reduced, operation of inserting a pipette does not become difficult.

Further, as illustrated in FIG. 8, the bottom portion of the recovery hole 111 is also constituted by the insulation 109, and is particularly formed in a mortar shape having a conical surface 109*b*. According to such a shape, since the solution is accumulated in the center of the bottom portion, it is easy to recover the solution even when an amount of the solution is small.

Further, the outflow portion of the gel 113 is the second end surface 113*b*, and an area of the second end surface 113*b* (that is, a cross-sectional area of the gel 113 taken along a plane orthogonal to the direction of the electric field in the outflow portion) is smaller than that of the second end surface 13*b* of the first embodiment. Further, the area of the second end surface 113*b* is smaller than an area of the first end surface 113*a* (similarly, a cross-sectional area of the inflow portion taken along a plane orthogonal to the direction of the electric field). For the above reason, as described above, the volume of the recovery hole 111 can be configured to be smaller than the volume of the injection hole 110, and the concentration of the target biological substance in the solution to be recovered is improved.

In the present embodiment, as shown in FIGS. 7 and 8, the shapes of the insulation 109 and the gel 113 are changed. In particular, the configuration is such that an internal space of the insulation 109, that is, a space filled with the gel 113 becomes narrower from the injection hole 110 toward the recovery hole 111. Further, in at least a part of the gel 113 (particularly, a region including the second end surface 113b), a cross-sectional area of the gel 113 taken along a plane orthogonal to the direction of the electric field decreases in a direction from the first end surface 113a toward the second end surface 113b (that is, decreases along the direction in which the target biological substance migrates).

By such a configuration, the target biological substance can be efficiently guided toward the second end surface 113b that is relatively small. In particular, since the cross-sectional area of the gel 113 is continuously reduced in the examples of FIGS. 7 and 8, the target biological substance is not caught and retained at a specific site of the gel 113, and the guidance of the target biological substance becomes more efficient.

In general, in the electrophoresis method, a cross-sectional area of the recovery hole cannot be made smaller than a distribution cross-sectional area of the target biological substance. However, in the present embodiment, since the distribution cross-sectional area of the target biological substance gradually decreases, the cross-sectional area of the recovery hole 111 can be designed to be small. For this reason, an amount of the solution to be recovered can be reduced, and thus the concentration can be improved.

Note that, as illustrated in FIG. 6, the insulation 109 has an upper opening portion 122 forming an opening of the injection hole 110 and an upper opening portion 123 forming an opening of the recovery hole 111. The configuration of the upper opening portion 122 can be the same as that of the upper opening portion 22 of the first embodiment. Further, the upper opening portion 123 can be formed along the shape of the cylindrical surface 109a.

EXAMPLES

Hereinafter, an example of the first embodiment will be described.

(Preparation of Electrophoresis Gel)

An agarose gel having the injection hole 10 and the recovery hole 11 was prepared. The agarose gel was molded by pouring 3% SeaKem (registered trademark) GTG-TAE (manufactured by Lonza) into a plastic container. The injection hole 10 was formed to have a length of 1 mm×a width of 5 mm×a depth of 3 mm, and the recovery hole 11 was formed to have a length of 2 mm×a width of 5 mm×a depth of 4 mm by inserting a comb before the agarose gel was solidified. The distance between the injection hole 10 and the recovery hole 11 was set to 20 mm.

(Electrophoresis)

The prepared agarose gel was horizontally installed on an electrophoresis device (Mupid (registered trademark), manufactured by Mupid CO., LTD.), 1×TAE buffer solution (Tris Acetate EDTA Buffer) was poured into the electrophoresis tank 14, and the electrophoresis tank 14 was filled with the buffer solution almost to a top surface of the agarose gel. The inside of the injection hole 10 and the recovery hole 11 was also filled with the TAE buffer solution. After the above, 1 μL of 6×DNA Loading Dye (manufactured by Thermo Fisher Scientific Inc.) was mixed with 5 μL of sample solution containing nucleic acids of various lengths to form injection solution, and the injection solution was injected into the injection hole 10.

After injection of the injection solution, a voltage of 100 V was applied to perform electrophoresis.

Next, when a nucleic acid of a target length was present immediately before the recovery hole 11, the voltage was stopped, and the buffer solution in the recovery hole 11 was removed. Next, 40 μL of distilled water was injected and removed after 20 times of pipetting.

Next, 40 μL of distilled water was injected as a solvent.

A voltage of 100V was applied again, and after the nucleic acid of the target length entered the recovery hole, the voltage was stopped to acquire nucleic acid solution.

The obtained solution was quantified using a nucleic acid quantifier TapeStation 4200 (Agilent Technologies, Ltd.). From a quantification result, it was confirmed that 80% of the target nucleic acid was recovered without contamination.

Next, an example of the second embodiment will be described.

(Preparation of Electrophoresis Gel)

An agarose gel having the injection hole 110 and the recovery hole 111 was prepared. The agarose gel was molded by pouring 3% SeaKem (registered trademark) GTG-TAE (manufactured by Lonza) into a plastic container. The injection hole 110 was formed to have a length of 1 mm×a width of 5 mm×a depth of 3 mm, and the recovery hole 111 was formed to be in a cylindrical shape having a radius of 1.5 mm and a depth of 3 mm by inserting a comb before the agarose gel was solidified. The distance between the injection hole 110 and the recovery hole 111 was set to 20 mm.

(Electrophoresis)

The prepared agarose gel was horizontally installed on an electrophoresis device (Mupid (registered trademark), manufactured by Mupid CO., LTD.), 1×TAE buffer solution (Tris Acetate EDTA Buffer) was poured into the electrophoresis tank 14, and the electrophoresis tank 14 was filled with the buffer solution almost to a top surface of the agarose gel. The inside of the injection hole 110 and the recovery hole 111 was also filled with the TAE buffer solution. After the above, 1 μL of 6×DNA Loading Dye (manufactured by Thermo Fisher Scientific Inc.) was mixed with 5 μL of sample solution containing nucleic acids of various lengths to form injection solution, and the injection solution was injected into the injection hole 110.

After injection of the injection solution, a voltage of 100 V was applied to perform electrophoresis.

Next, when a nucleic acid of a target length was present immediately before the recovery hole 111, the voltage was stopped, and the buffer solution in the recovery hole 111 was removed. Next, 20 μL of distilled water was injected and removed after 20 times of pipetting. Next, 20 μL of distilled water was injected as a solvent.

A voltage of 100V was applied again, and after the nucleic acid of the target length entered the recovery hole, the voltage was stopped to acquire nucleic acid solution.

The obtained solution was quantified using a nucleic acid quantifier TapeStation 4200 (Agilent Technologies, Ltd.). From a quantification result, it was confirmed that 80% of the target nucleic acid was recovered without contamination.

In the first and second embodiments, variations below can be made.

In the first and second embodiments, since Step 2 and Step 5 include the voltage application stop step, the migration of the target biological substance can be temporarily stopped, and work such as cleaning can be executed without haste. However, it is also possible to omit the voltage application stop step. That is, Step 3, Step 4, Step 6, and the like can be executed while the application of the voltage is continued. As a matter of course, in a case where the voltage application stop step is omitted in any of the above, the voltage application start step (or the voltage application restart step) immediately after that is unnecessary.

In the first and second embodiments, Step 7 and Step 8 may be omitted in a case where, for example, there is only one type of the target biological substance. In this case, each of Steps 2 to 6 is executed once for each execution of the method for recovering a biological substance.

In the first and second embodiments, the film 12 may be omitted. In this case, the entire circumference of the recovery hole 11 may be covered with a gel, or any peripheral wall structure may be used instead of the film 12. Further, in a case where it is not necessary to retain the target biological substance in the recovery hole (in a case where, for example, the recovery timing can be accurately designed), the film 12 does not need to be a selective permeable film.

In the first and second embodiments, the insulation may be omitted in a case where, for example, the direction of the electric field in the gel can be accurately controlled.

In the first and second embodiments, the shapes of the injection hole and the recovery hole can be changed as desired. In particular, in the second embodiment, in a case where ease of pipetting operation is not a problem, the recovery hole 111 may have a shape with no cylindrical surface 109a or conical surface 109b, and may have, for example, a thin rectangular parallelepiped shape.

REFERENCE SIGNS LIST

2 step (voltage application start step, voltage application stop step)
3 step (buffer solution removing step, cleaning step)
4 step (solvent injection step)
5 step (voltage application restart step, voltage application stop step)
6 step (recovery step)
9, 109 insulation
109a cylindrical surface
109b conical surface
10, 110 injection hole
11, 111 recovery hole
12 film
13, 113 gel (separation medium)
14 electrophoresis tank
15 power supply
16 voltage control unit
17 negative electrode
18 positive electrode
19 buffer solution
21, 121 electrophoresis unit
22, 23, 122, 123 upper opening portion
24 electrophoresis device
13a, 113a first end surface (inflow portion)
13b, 113b second end surface (outflow portion)

All publications, patents, and patent applications cited herein are hereby incorporated by reference in their entirety.

The invention claimed is:

1. A method for recovering a biological substance using an electrophoresis device having a separation medium and a recovery hole and using an electric field, wherein, in the separation medium, a cross-sectional area of an outflow portion from which the biological substance flows out taken along a plane orthogonal to a direction of the electric field is smaller than a cross-sectional area of an inflow portion into which the biological substance flows taken along the plane orthogonal to the direction of the electric field, the method for recovering the biological substance comprising:

injecting an injecting solution containing the target biological substance into an injection hole;

a voltage application start step of starting application of a voltage for moving the biological substance toward the recovery hole;

a buffer solution removing step of removing buffer solution in the recovery hole before the biological substance reaches the recovery hole after the voltage application start step;

a solvent injection step of injecting a solvent into the recovery hole after the buffer solution removing step;

a recovery step of recovering the biological substance that reached the recovery hole after the solvent injection step; and a cleaning step of cleaning the recovery hole using cleaning liquid between the buffer solution removing step and the solvent injection step;

wherein in at least a part of the separation medium, a cross-sectional area having a height and width taken along the plane orthogonal to the direction of the electric field decreases in height and width two axes in a direction from the inflow portion toward the outflow portion.

2. The method for recovering a biological substance according to claim 1, further comprising, after the recovery step:

a buffer solution injection step of injecting buffer solution into the recovery hole;

an additional one of the buffer solution removing step;

an additional one of the solvent injection step; and an additional one of the recovery step.

3. The method for recovering a biological substance according to claim 1, further comprising:

a voltage application stop step of stopping application of the voltage between the voltage application start step and the buffer solution removing step; and a voltage application restart step of starting application of the voltage between the solvent injection step and the recovery step.

4. The method for recovering a biological substance according to claim 1, wherein the electrophoresis device includes a selective permeable film, the selective permeable film is provided on a side opposite to the outflow portion with respect to the recovery port, and the selective permeable film does not allow the target biological substance to pass through, and allows an ion to pass through.

5. The method for recovering a biological substance according to claim 1, comprising an insulating container that covers a region between the inflow portion and the outflow portion of the separation medium.

* * * * *